United States Patent
Mizata et al.

(10) Patent No.: US 8,382,184 B2
(45) Date of Patent: Feb. 26, 2013

(54) SOUND ABSORPTION SHEET FOR MOTOR VEHICLES AND ENGINE UNDER COVER FOR MOTOR VEHICLES USING SOUND ABSORPTION SHEET

(75) Inventors: Shuichi Mizata, Niwa-gun (JP); Shinya Hayasaka, Konan (JP)

(73) Assignee: Howa Textile Industry Co., Ltd., Kasugai (JP)

( * ) Notice: Subject to any disclaimer, the term of this patent is extended or adjusted under 35 U.S.C. 154(b) by 0 days.

(21) Appl. No.: 13/144,606

(22) PCT Filed: Feb. 10, 2010

(86) PCT No.: PCT/JP2010/051926
§ 371 (c)(1),
(2), (4) Date: Jul. 14, 2011

(87) PCT Pub. No.: WO2010/092968
PCT Pub. Date: Aug. 19, 2010

(65) Prior Publication Data
US 2011/0272960 A1    Nov. 10, 2011

(30) Foreign Application Priority Data

Feb. 12, 2009  (JP) ................................. 2009-029318
Feb. 5, 2010   (JP) ................................. 2010-024208

(51) Int. Cl.
    *F02B 77/13*  (2006.01)
(52) U.S. Cl. ..................................................... 296/39.3
(58) Field of Classification Search ................. 296/39.3, 296/211; 181/151, 198, 210, 284
See application file for complete search history.

(56) References Cited

U.S. PATENT DOCUMENTS

| | | | |
|---|---|---|---|
| 2011/0067949 A1* | 3/2011 | Mori et al. | 181/205 |
| 2011/0221223 A1* | 9/2011 | Mizata | 296/39.3 |
| 2012/0043779 A1* | 2/2012 | Glickman | 296/39.3 |

FOREIGN PATENT DOCUMENTS

| | | |
|---|---|---|
| JP | U-53-82020 | 7/1978 |
| JP | U-54-167174 | 11/1979 |
| JP | A-2-171354 | 7/1990 |
| JP | A-2001-10544 | 1/2001 |
| JP | A-2007-106304 | 4/2007 |

OTHER PUBLICATIONS

May 18, 2010 International Search Report issued for International Application No. PCT/JP2010/051926 (with Translation).

* cited by examiner

*Primary Examiner* — H Gutman
(74) *Attorney, Agent, or Firm* — Oliff & Berridge, PLC

(57) ABSTRACT

A sound absorption sheet is constructed by both films which are made of a fire-retardant polyethylene resin and layered with each other. The film has a flat film portion and a large number of air bubble portions. The flat film portion is adhered at its rear face to the flat film from the side of the front face. A large number of air bubble portions are dispersed in a staggered arrangement with each other along the planar direction of the film and raised and formed cylindrically along the thickness direction of the flat film portion in a direction separating from the film.

14 Claims, 18 Drawing Sheets

SOUND ABSORPTION SHEET FOR MOTOR VEHICLES AND ENGINE UNDER COVER FOR MOTOR VEHICLES USING SOUND ABSORPTION SHEET

BACKGROUND OF THE INVENTION

1. Field of the Invention

The present invention relates to a sound absorption sheet for a motor vehicle and an engine under cover for a motor vehicle using the sound absorption sheet.

2. Description of the Related Art

Conventionally, in a motor vehicle, there has been proposed an under cover for an engine or an engine under cover disclosed in, for example, Japanese Patent Laid-Open Publication No. 2001-10544. The engine under cover is disposed at the bottom part side of an engine, and a large number of small projections are formed on an inner wall face of the engine under cover at its engine side.

According to such a construction, when noises generated from the engine enter a large number of the small projections at the inner wall face of the engine under cover, the noises are irregularly reflected by a large number of the small projections. Thus, sounds reflected by the irregular reflection interfere to each other and are offset or cancelled out to each other. As a result, reduction of noises shall be able to realize sound absorption by the engine under cover without a sound absorption material.

In the engine under cover constructed as above, a large number of the small projections are merely formed on the inner wall face of the engine under cover at its engine side, as described above. Thus, even if a large number of the small projections are formed respectively into a semispherical shape and regularly arrayed on the inner wall face of the engine under cover, it may be difficult to reduce the noises favorably with the above-mentioned mere cancellation of the sounds reflected to each other. This means that a large number of the small projections lack sound absorption performance. As a result, there is caused the drawback that absorption of noises cannot be favorably secured by a large number of the small projections.

SUMMARY OF THE INVENTION

It is therefore an object of the present invention to provide a sound absorption sheet for a motor vehicle which exerts favorably sound absorption performance to noises by effectively utilizing a sheet dispersing a large number of air bubbles between both layers which are formed respectively by a polymer organic material and layered with each other.

It is another object of the present invention to provide an engine under cover for a motor vehicle using the sound absorption sheet.

In order to solve these objects according to the present invention, there is provided a sound absorption sheet for a motor vehicle, which comprises:

a first layer formed by a polymer organic material having flexible elasticity; and a second layer formed by a polymer organic material having flexible elasticity and adhered along the first layer in a layered state.

the second layer has a large number of air bubble portions being dispersed respectively along the first layer and raised in a direction separating from the first layer so as to be able to exert sound absorbing performance.

Accordingly, if the sound absorption sheet is disposed at its second layer in a constituent portion located in a propagation direction of noises such as engine noises of a motor vehicle or the like so as to oppose the propagation direction of the noises, reflection to the noises done by the sound absorption sheet can be favorably restrained by the sound absorption sheet under each air bubble portion thereof, when the noises are propagated to the constituent portion and then enters the sound absorption sheet.

This means that the sound absorption sheet can exert favorable sound absorbing performance. As a result, the above-mentioned noises can be favorably reduced by means of the sound absorption sheet.

Also, the present invention is characterized in that both the first and second layers are respectively a film having a thickness within a range of 7 ($\mu$m) to 150 ($\mu$m), and that a large number of the air bubble portions are respectively a cylindrical air bubble portion having a diameter and a height respectively within a range of 5 (mm) to 100 (mm).

Accordingly, the light weight and flexible elasticity of the sound absorption sheet can be ensured by that the both first and second layers are respectively a film having the thickness within the range of 7 ($\mu$m) to 150 ($\mu$m). And, the sound absorbing performance of each air bubble portion can be favorably ensured by that a large number of the air bubble portions are respectively a cylindrical air bubble portion having a diameter and a height respectively within the range of 5 (mm) to 100 (mm).

Additionally, in case the air bubble portion is formed for example, cylindrical, the above-mentioned diameter corresponds to a diameter of a peripheral wall portion of the cylindrical air bubble portion. And, in case the air bubble portion has for example, a square tube shape, the above-mentioned diameter corresponds to a width between both the opposing walls of the peripheral wall portion of the square-tube-shaped air bubble portion.

Further, the present invention is characterized by providing a third layer which is formed by the porous material and layered along the second layer so as to oppose the first layer through the second layer.

Accordingly, in case the sound absorption sheet is disposed at its third layer in a constituent portion located in a propagation direction of the above-mentioned noises so as to oppose the propagation direction of the noises, the noises enter the third layer of the sound absorption sheet from the side of the front face thereof, when the noises are propagated to the constituent portion and then enter the sound absorption sheet.

Then, the noises entering the third layer as described above are absorbed and reduced by the third layer under the sound absorbing performance of the forming material or porous material of the third layer. Thereafter, the noises reduced by the third layer as described above further enter the second layer from the side of the front face thereof. Thus, the noises can be favorably absorbed by the first and second layers under each air bubble portion. As a result, the noises can be favorably reduced by means of the sound absorption sheet.

Herein, the above-mentioned noises can be favorably reduced by both the first and second layers under the favorable sound absorbing performance of each air bubble portion in combination with the above-described sound absorbing performances of the third layer, if both the first and second layers are respectively a film having the thickness within the range of 7 ($\mu$m) to 150 ($\mu$m), and a large number of the air bubble portions are respectively a cylindrical air bubble portion having the diameter and the height respectively within the range of 5 (mm) to 100 (mm).

Further, the present invention is characterized in that the third layer has a basis weight within a range of 10 (g/m$^2$) to 200 (g/m$^2$).

Accordingly, the sound absorbing performance of the third layer can be ensured further favorably. Thus, the third layer absorbs noises further favorably. As a result, the sound absorbing performance as the sound absorption sheet can be further improved.

Still further, according to the present invention, there is provided a sound absorption sheet for a motor vehicle, which comprises:

a first layer formed by a polymer organic material; a second layer formed by a polymer organic material having flexible elasticity and adhered along the first layer in a layered state; a third layer formed by a porous material and layered along the second layer so as to oppose the first layer through the second layer; and a fourth layer formed by a metal material and layered along the first layer so as to oppose the second layer through the first layer.

The second layer has a large number of air bubble portions being dispersed respectively along the first layer and raised in a direction separating from the first layer so as to be able to exert sound absorbing performance.

Accordingly, in case the sound absorption sheet is disposed at its third layer in a constituent portion located in a propagation direction of the above-mentioned noises so as to oppose the propagation direction of the noises, the noises enter the third layer of the sound absorption sheet from the side of the front face thereof when the noises are propagated to the constituent portion and then enter the sound absorption sheet.

Then, the noises entering the third layer as described above are absorbed and reduced by the third layer under the sound absorbing performance of the forming material or porous material of the third layer. Subsequently, the noises reduced by the third layer as described above further enter the second layer from the side of the front face thereof. Thereafter, these noises are favorably absorbed by the first and second layers under each air bubble portion and enter the fourth layer.

Herein, the noises entered the fourth layer as described above is reflected by the fourth layer to the side of the first layer, because the fourth layer is made of a metal material. Accordingly, the noises reflected as described above are favorably absorbed again by the first and second layers under each air bubble portion and then, favorably absorbed by the third layer. As a result, by means of the sound absorption sheet, the noises can be favorably absorbed by each of the first to third layers under each air bubble portion in both of a process from the third layer to the fourth layer and a process reflected from the fourth layer to the third layer.

Still further, according to the present invention, there is provided an engine under cover for a motor vehicle disposed along a bottom part of an engine arranged in an engine room of the motor vehicle, which comprises:

a cover main body made of a synthetic resin plate and supported along the bottom part of the engine; and a sound absorption sheet having first to fourth layers.

The first layer is formed by a polymer organic material having flexible elasticity.

The second layer is formed by a polymer organic material having flexible elasticity and is adhered along the first layer in a layered state. The second layer has a large number of air bubble portions dispersed respectively along the first layer and raised in a direction separating from the first layer so as to be able to exert sound absorbing performance.

The third layer is formed by a porous material and layered along the second layer so as to oppose the first layer through the second layer.

The sound absorption sheet is attached from the bottom part side of the engine along the cover main body so as to locate the second layer on the engine side of the first layer.

Accordingly, even if noises such as an engine sound or the like of a motor vehicle are propagated to the bottom part side of the engine and enter the sound absorption sheet, reflection to the noises can be favorably restrained by the sound absorption sheet under each air bubble portion thereof. Therefore, the noises can be favorably reduced by means of the sound absorption sheet.

As a result, by means of utilizing the engine under cover, the noises such as an engine sound or the like propagated to the bottom part side of the engine can be favorably absorbed by the sound absorption sheet without propagating as noises toward the interior of the vehicle compartment or the outside of the motor vehicle.

Still further, according to the present invention, there is provided an engine under cover for a motor vehicle disposed along a bottom part of an engine arranged in an engine room of the motor vehicle, which comprises:

a cover main body made of a synthetic resin plate and supported along the bottom part of the engine; and a sound absorption sheet having first to fourth layers.

The first layer is formed by a polymer organic material. The second layer is formed by a polymer organic material having flexible elasticity and adhered along said first layer in a layered state. This second layer has a large number of air bubble portions dispersed respectively along the first layer and raised in a direction separating from the first layer so as to be able to exert sound absorbing performance.

The third layer is formed by a porous material and layered along the second layer so as to oppose the first layer through the second layer. The fourth layer is formed by a metal material and layered along the first layer so as to oppose the second layer through the first layer.

The sound absorption sheet is attached from the bottom part side of the engine along the cover main body so as to locate the second layer on the engine side of the first layer.

Accordingly, when the above-mentioned noises are propagated to the side of the bottom part of the engine and enter the sound absorption sheet, the noises enter the third layer of the sound absorption sheet from the side of the front face thereof. Thus, the noises entered the third layer as described above are absorbed and reduced by the third layer under the sound absorbing performance of the forming material of the third layer or the porous material thereof.

Thereafter, the noises reduced by the third layer as described above enter further the second layer from the side of the front face thereof. Then, reflection to the noises done by the second and first layers is favorably restrained by the first and second layers under each air bubble portion and enters the fourth layer.

Herein, the noises entered the fourth layer are reflected by the fourth layer to the first layer, since the fourth layer is formed by a metal material. Thus, the noises reflected as described above are favorably absorbed again by the first and second layers under each air bubble portion and then, favorably absorbed by the third layer.

This means that by means of the sound absorption sheet, the noises can be favorably absorbed by each of the first to third layers under each air bubble portion in both of a process from the third layer to the fourth layer and a process reflected from the fourth layer to the third layer.

As a result, by means of utilizing the engine under cover, noises such as an engine sound or the like propagated to the bottom part side of the engine can be favorably absorbed by the sound absorption sheet without propagating as noises into the interior of the vehicle compartment or the outside of the motor vehicle.

Further, the present invention is characterized in that each outer periphery portions of the third, second, first, and fourth layers is heated and fusioned on the basis of the outer periphery portion of the fourth layer to be formed as an annular flange portion.

Accordingly, For assembling the engine under cover to the cover main body, the engine under cover can be firmly assembled to the cover main body only by attaching the annular flange portion of the engine under cover onto the front face of the cover main body with a double-sided tape from the side of the fourth layer.

As a result, not only the engine under cover is firmly attached to the cover main body easily with the double-sided tape but also absorption of noises done by the engine under cover can be achieved further reliably under the firm attachment of the engine under cover onto the cover main body as described above.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Figure 1:
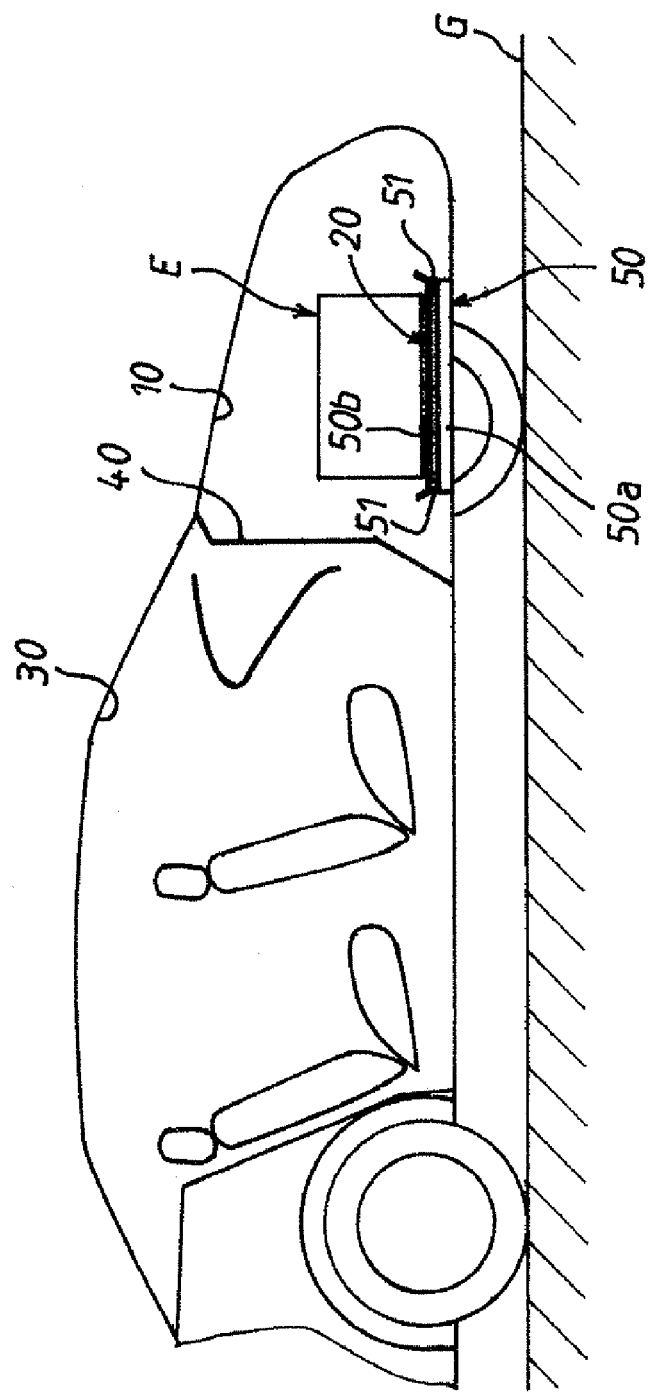
FIG. 1 is a partially cut-away schematic outline side view of a motor vehicle to which a first embodiment of an engine under cover according to the present invention is applied.

Hereinafter each embodiment of the present invention will be described below, referring to the attached drawings. FIG. 1 shows a first embodiment of an engine under cover according to the present invention which is applied to an engine E of a motor vehicle or an automotive vehicle of a sedan-type from a side of its bottom portion.

In the motor vehicle, the engine E is assembled in an engine room 10 of the motor vehicle, and an oil pan 20 is disposed right under the bottom portion of the engine E.

In the embodiment, a dashboard 40 serves to isolate the engine room 10 from a compartment 30 of the motor vehicle, and both dash insulators (not shown) are attached to the dashboard 40 from insides of the engine room 10 and the vehicle compartment 30, respectively. A food insulator (not shown) is attached to a bonnet (or hood) of the engine room 10 from inside of the engine room 10.

Figure 2:
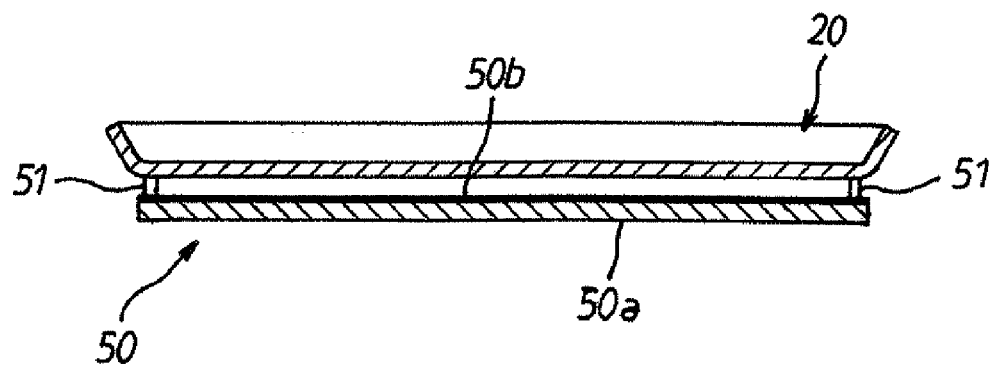
FIG. 2 is an enlarged sectional view illustrating the engine under cover of FIG. 1 together with an oil pan.
Figure 3:
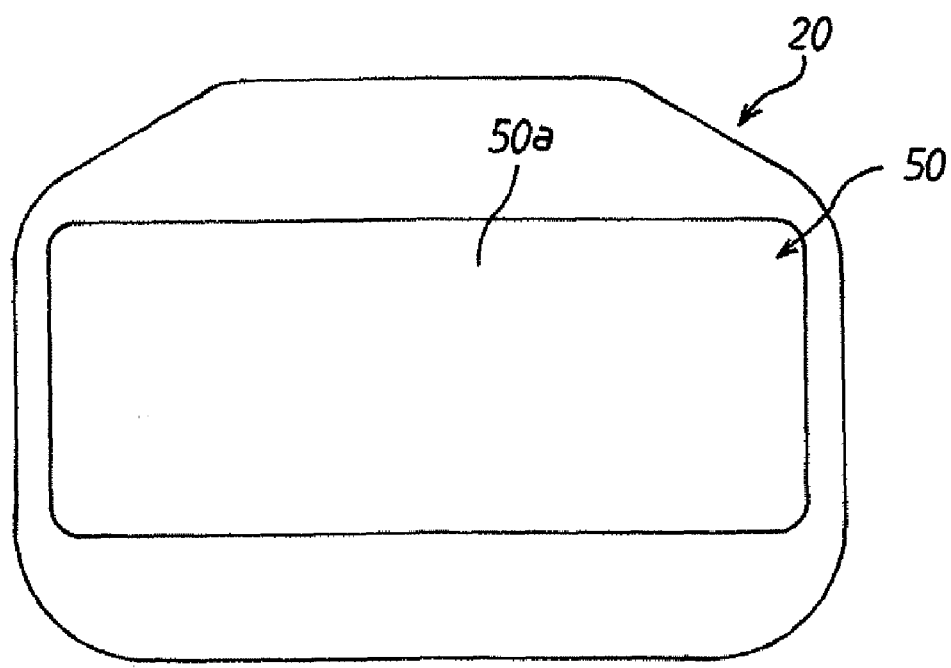
FIG. 3 is a bottom view illustrating the engine under cover of FIG. 2 together with the oil pan.

The above-described engine under cover (hereinafter called to as an engine under cover 50) is, as shown in FIGS. 2 and 3, supported by the oil pan 20 at right under thereof in the engine room 10. The engine under cover 50 opposes a running road surface G (See FIG. 1) of the motor vehicle at its rear face through a bottom-wall opening of the engine room 10.

The engine under cover 50 is provided with a cover main body 50a and a sound absorption sheet 50b. The cover main body 50a is formed by a synthetic resin plate and supported by way of each of support members 51 (See FIG. 2) at right under the oil pan 20 along the rear face of the oil pan 20. Accordingly, the cover main body 50a serves to protect the oil pan 20 and the engine E from splashed water, gravels, pebbles or the like from the running road surface G of the motor vehicle.

The sound absorption sheet 50b is attached to a front face of the cover main body 50a at its rear or back face (a rear face of a film 52 which will be described later). The sound absorption sheet 50b, therefore, opposes the rear face of the oil pan 20 through a gap at its front face (a front face of a film 53 which will be described later).

Herein, the construction of the sound absorption sheet 50b will be described in detail. The sound absorption sheet 50b is, as understood from FIG. 4 or 5, constructed by both films 52 and 53 which are respectively made of a fire-retardant polyethylene resin to be layered to each other. In the first embodiment, the both films 52 and 53 have respectively a predetermined thickness (for example, 20 (μm)), and the sum of each basis weight (weight or yield/unit area) of the both films 52 and 53 is a predetermined basis weight (for example, 80 (g/m$^2$)). In addition, in FIG. 4, the sound absorption sheet 50*b* is, for convenience' sake, depicted as a square, differing from a shape shown in FIG. 3.

Figure 4:
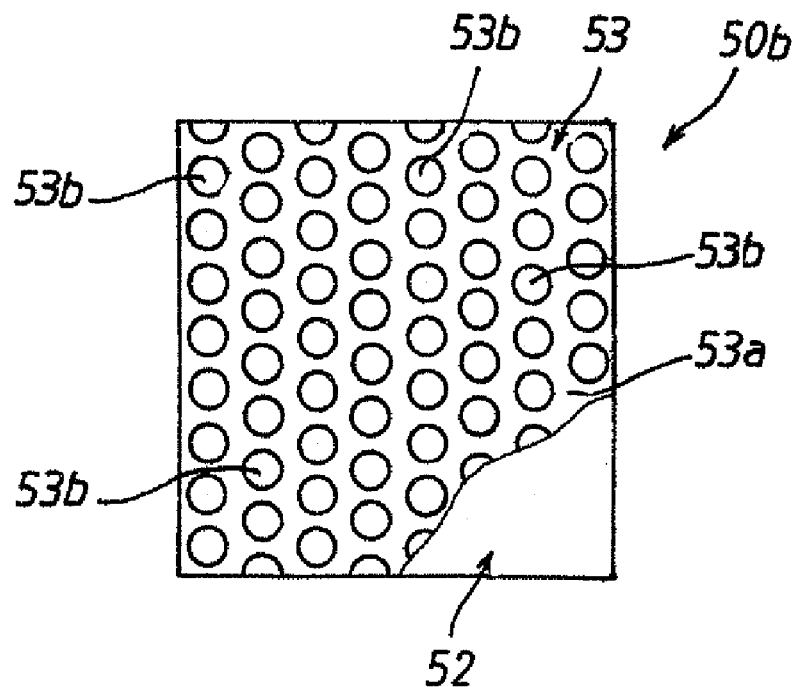
FIG. 4 is a partially cut-away plan view of a sound absorption sheet shown in FIG. 2.
Figure 5:
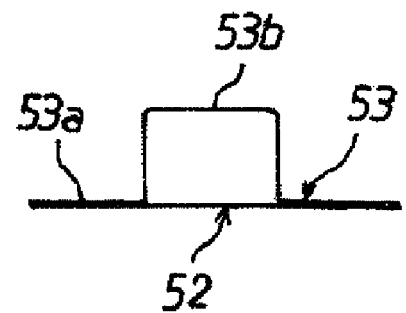
FIG. 5 is an enlarged sectional view of an air bubble portion of the sound absorption sheet shown in FIG. 4.

The film 52 is formed over its entirety in the form of a flat membrane or film. The film 53 has a flat membrane or film portion 53*a* and a large number of air bubble portions 53*b*. The film 53 is adhered at the rear face of the flat film portion 53*a* to the front face of the film 52. A large number of the air bubble portions 53*b* of the film 53 are, as shown in FIG. 4, formed in a staggered or tottering step arrangement to each other along the planar direction of the film 52. Also, a large number of the air bubble portions 53*b* are, as exemplified in FIG. 5, formed respectively by cylindrically raising or protuberating from each portion of the film 52 corresponding to each air bubble portion 53*b* toward the thickness direction of the flat film portion 53*a*. Air is sealed in the interior of each of a large number of the air bubble portions 53*b*.

In the first embodiment, a large number of the air bubble portions 53*b* are arranged in a staggered manner as will be described below. Herein, selecting one air bubble portion 53*b* among a large number of the air bubble portions 53*b*, the selected air bubble portion 53*b* is, as shown in FIG. 4, surrounded by six air bubble portions 53*b* which are arranged in a regular hexagon shape. Each distance between centers of the selected air bubble portion 53*b* and each of the above-mentioned six air bubble portions 53*b* becomes a predetermined identical distance together with each distance between centers of each of the adjacent air bubble portions 53*b* of the six air bubble portions 53*b*.

Also, each air bubble portion 53*b* has a predetermined outer diameter (for example, 20 (mm)) and a predetermined height (for example, 7 (mm)). Herein, the predetermined outer diameter corresponds to an outer diameter of a peripheral wall of the cylindrical air bubble portion 53*b*. The predetermined height corresponds to a gap from the front face of the film 52 to the front face of a top wall portion of the air bubble portion 53*b*. Also, the number of the air bubble portions 53*b* is predetermined as much as possible so that the sound absorbing coefficient of the sound absorption sheet 50*b* can be favorably exerted.

The sound absorption sheet 50*b* constructed as described above is manufactured as in the followings. Firstly, a fire-retardant polyethylene resin is prepared as a raw material of each of the both films 52 and 53. Then, the fire-retardant polyethylene resin, which is a raw material of the film 52, is melted so as to become a melted film (hereinafter referred to as a first melted film) and also, the fire-retardant polyethylene resin, which is a raw material of the film 53, is melted so as to become a melted film (hereinafter referred to as a second melted film). In this case, the second melted film is molded so as to raise a large number of the cylindrical air bubble portions along the thickness direction thereof, as described above.

Subsequently, the first and second melted films which are melted as described above are pressurized and cooled under vacuum forming or under being sandwiched by a pair of pressure rollers (not shown), thereby to be adhered to each other. As a result, manufacturing of the sound absorption sheet 50*b* is finished.

In addition, the above-described pressurizing force to the first and second melted films is set into such a degree that the corresponding portions of the second melted film to the respective air bubble portions 53*b* can be recovered to their respective original shapes after finishing of the pressurization and is also set into such a value that the corresponding portion of the second melted film to the flat film portion 53*a* can be uniformly adhered to the first melted film.

In the first embodiment constructed as described above, the above-mentioned constructed engine under cover 50 is supported to the oil pan 20 from its subjacency in the engine room 10 as described above. Moreover, the engine under cover 50 is constructed by attaching the sound absorption sheet 50*b* to the cover main body 50*a* of a synthetic resin plate from its front face side, as described above.

Herein, the sound absorption sheet 50*b* is, as described above, constructed by adhering the flat film portion 53*a* of the film 53 to the film 52 from its front face side. A large number of the air bubble portions 53*b* of the film 53 protuberate respectively toward the thickness direction of the flat film portion 53*a* in the form of cylindrical shape and are disposed in the form of a staggered or tottering step arrangement, as described above.

As a result, the sound absorption sheet 50*b* is constructed into a double-layer structure of the both films 52 and 53 by way of the sealed air within each of a large number of the air bubble portions 53*b* which are disposed in the form of a staggered arrangement.

Furthermore, in such a sound absorption sheet 50*b* of the double-layer structure, each thickness of the both films 52 and 53 is 20 (μm), and the outer diameter and the height of each of the air bubble portions 53*b* is 20 (mm) and 7 (mm) respectively, as described above.

According to the sound absorption sheet 50*b* as constructed above, the films 52 and 53 are formed with 20 (μm) thinly by the polyethylene resin although they do not have air permeability, as described above. Thus, the both films 52 and 53 have flexible elasticity.

Herein, when the engine E generates, sounds (hereinafter referred to as engine sounds), for instance, during traveling or running of the motor vehicle, the engine sounds are propagated as noises toward its periphery. Among the engine sounds which are propagated toward the periphery of the engine E as described above, the engine sounds propagated toward the bottom part side of the engine E are further propagated toward the engine under cover 50 through the oil pan 20 to be incident on the sound absorption sheet 50*b* from its front face side thereof (the front face side of the film 53).

Although the engine sounds which are incident on the sound absorption sheet 50*b* as described above are reflected by the sound absorption sheet 50*b*, the reflection to the engine sounds caused by the sound absorption sheet 50*b* is restrained favorably by the sound absorption sheet 50*b* under each of the air bubble portions 53*b* which the sound absorption sheet 50*b* has, as described above.

This means that each of the air bubble portions 53*b* acts an important role in the both films 52 and 53 constructing the sound absorption sheet 50*b* for exerting sound absorbing performances, and thus, the sound absorption sheet 50*b* exerts favorable sound absorbing performances. Accordingly, by means of the sound absorption sheet 50*b*, the engine sounds which are incident on the sound absorption sheet 50*b* can be favorably reduced.

As a result, the engine sounds which are propagated to the bottom part side of the engine E, as described above can be favorably absorbed and insulated by the sound absorption sheet 50*b* without propagation toward the interior of the vehicle compartment or the outside of the motor vehicle as noises. Also, disturbance sounds or the like which propagate into or are incident on the sound absorption sheet 50*b* similarly to the engine sounds can be absorbed and insulated by the sound absorption sheet 50*b*.

In addition, engine sounds and disturbance sounds which are propagated upward and rearward of the engine E among the engine sounds propagated toward the periphery of the engine E as described above are absorbed by the hood insulator and the dash insulator.

Further, the polyethylene resin forming the both films 52 and 53 has fire retardancy as described above. Thus, the both films 52 and 53 can favorably absorb the engine sounds and the disturbance sounds without damage caused by heat, even if the temperature of the engine E becomes high.

Still further, the basis weight of each of the both films 52 and 53 is 80 (g/m$^2$) as described above. This means that the both films 52 and 53 are extremely light-weighted as the sound absorption sheet. Moreover, the forming material of the both films 52 and 53 is a polyethylene resin, even though it has fire retardancy. Thus, each of the films 52 nor 53 does not have a water containing property. Therefore, the weight of each of the films 52 and 53 will not increase due to water contained by each of the films.

Accordingly, even if the sound absorption sheet 50b is submerged, for example, in rain water during driving of the motor vehicle, both of the films 52 and 53 constructing the sound absorption sheet 50b can be always maintained to be light-weighted without increase of weight thereof caused by containing water like felt or glass wool with a high sound absorption property, and also both of the films 52 and 53 are capable of maintaining favorably the sound absorption property as the sound absorption sheet 50b to the engine sounds or disturbance sounds without impairing of the originally favorable sound absorption property thereof caused by containing water.

Furthermore, the both films 52 and 53 are capable of favorably maintaining the original shapes, because they are formed by a polyethylene resin so as to have flexible elasticity, as described above. As a result, handling of the above-described sound absorption sheet 50b can be extremely maintained easily. In addition, the sound absorption sheet 50b can be provided as a sound absorption sheet having a lower cost and a lighter weight, since it is manufactured so as to have the above-described construction.

Incidentally, the sound absorption sheet 50b of the first embodiment is referred to as a working example. In addition to the working example (hereinafter called as a second working example), prepared are first and third working examples and first and second comparative examples.

By using each of these working examples and comparative examples as each sample, a reverberation chamber sound absorbing coefficient test was adopted to each sample so as to examine a relationship between a sound absorbing coefficient and a frequency.

Herein, the above-described first working example has the same construction as the above-described second working example, except that it has the basis weight 50 (g/m$^2$) and has each air bubble portion of which the outer diameter and the height are 7 (mm) and 3 (mm) respectively. Also, the above-described third working example has the same construction as the above-described second working example, except that it has the basis weight of 100 (g/m$^2$) and has each air bubble portion of which the outer diameter and the height are 30 (mm) and 13 (mm) respectively.

On the other hand, the above-described first comparative example is constructed by a nonwoven fabric of flat-plate having the basis weight of 80 (g/m$^2$) and the thickness of 1 (mm), differing from the above-described second example. Also, the above-described second comparative example is constructed by a felt of flat-plate having the basis weight of 650 (g/m$^2$) and the thickness of 13 (mm), differing from the above-described second example. In addition, the specification of each of the above-mentioned samples is as shown in Table 1 and Table 2 below:

TABLE 1

| Sample | Basis weight of sample (g/m$^2$) | Thickness of film (μm) | Outer diameter of air bubble portion (mm) | Height of air bubble portion (mm) | Corresponding graph |
|---|---|---|---|---|---|
| First example | 50 | 20 | 7 | 3 | 1 |
| Second example | 80 | 20 | 20 | 7 | 2 |
| Third example | 100 | 20 | 30 | 13 | 3 |

TABLE 2

| Sample | Basis weight of sample (g/m$^2$) | Thickness of sample (mm) | Corresponding graph |
|---|---|---|---|
| First comparative example | 80 | 1 | 4 |
| Second comparative example | 650 | 13 | 5 |

Figure 6:
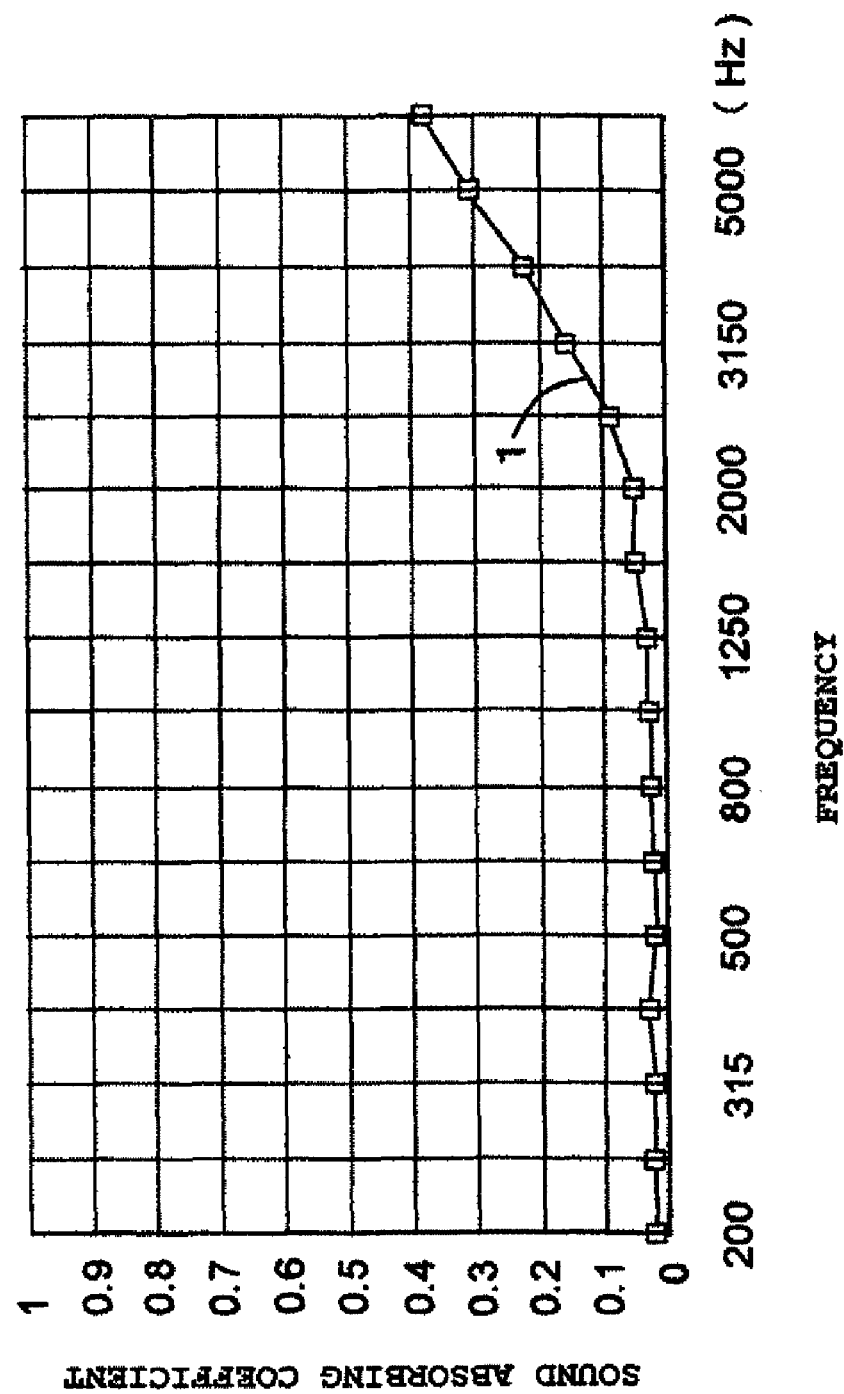
FIG. 6 is a graph illustrating a relationship between a sound absorbing coefficient and a frequency of a first working example of the first embodiment.

Examining a relationship between the sound absorbing coefficient and the frequency regarding the first working example by the above-mentioned reverberation chamber sound absorbing coefficient test, a graph 1 (See Table 1) shown in FIG. 6 was obtained.

Figure 7:
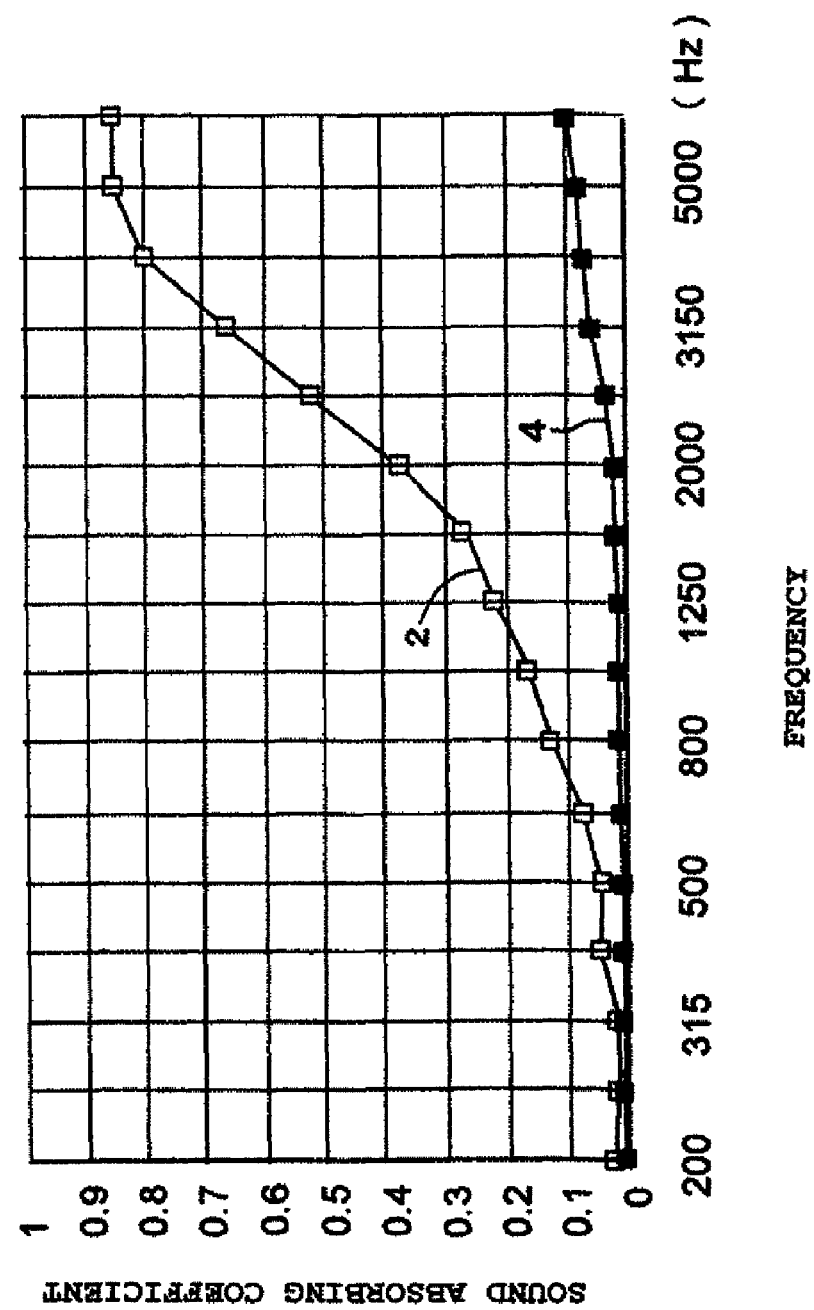
FIG. 7 is each graph illustrating respectively a relationship between the sound absorbing coefficient and the frequency of each of a second working example and a first comparative example of the first embodiment.
Figure 8:
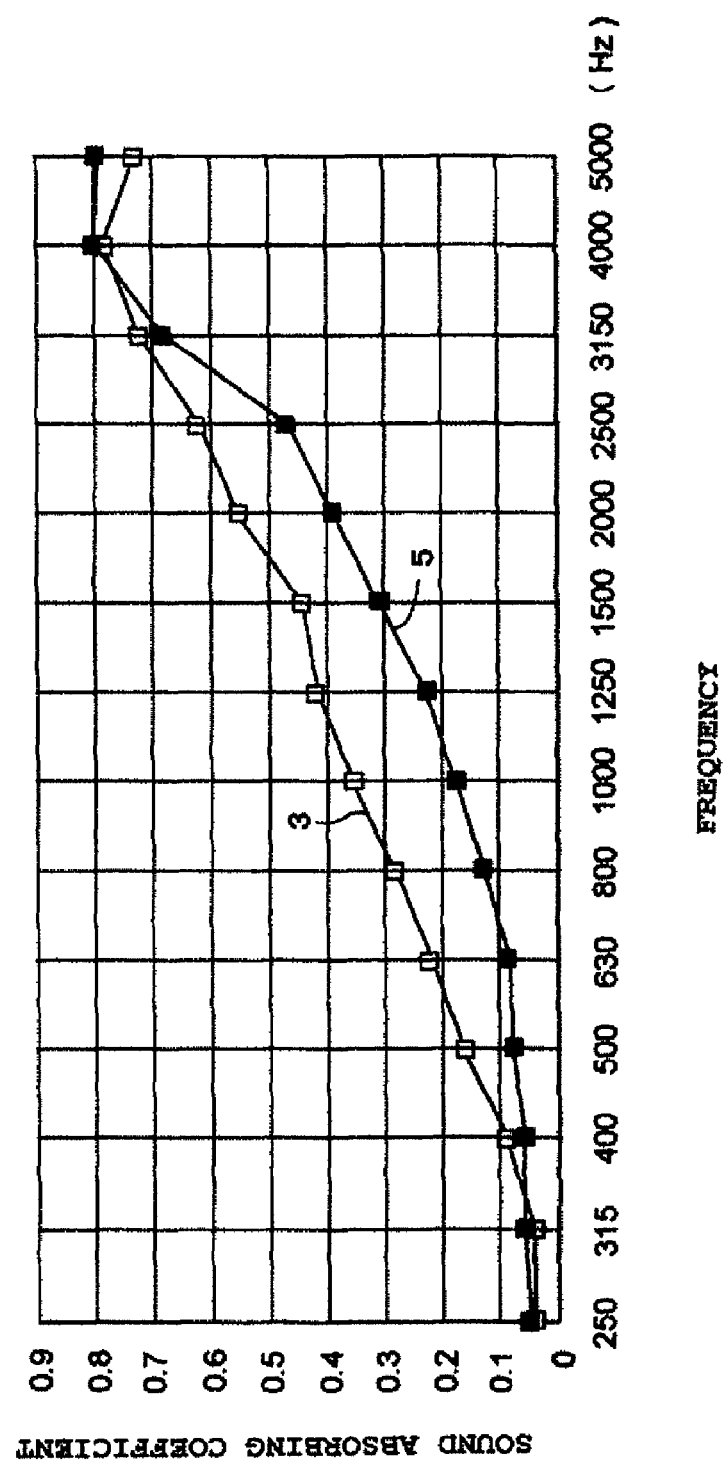
FIG. 8 is each graph illustrating respectively a relationship between the sound absorbing coefficient and the frequency each of a third working example and a second comparative example of the first embodiment.

Also, examining a relationship between the sound absorbing coefficient and the frequency regarding each of the second and third working examples by the above-mentioned reverberation chamber sound absorbing coefficient test, graphs 2 and 3 (See Table 1) which are shown respectively in FIGS. 7 and 8 were obtained. In addition, the above-described frequency is a frequency of sounds generated from the engine E under the operation thereof, that is, a frequency within a predetermined frequency range (for example, a range of 200 (Hz) to 6000 (Hz)).

On the other hand, examining a relationship between the sound absorbing coefficient and the frequency regarding each of the first and second comparative examples by the reverberation chamber sound absorbing coefficient test, graphs 4 and 5 (See Table 2) shown respectively in FIGS. 7 and 8 were obtained.

By comparing the graphs 1 to 3 of FIGS. 6 to 8 corresponding to the above-mentioned first to third working examples with each other, the following things can be understood.

That is, it can be understood that the sound absorbing coefficient is raised in accordance with rise of the frequency within the above-mentioned predetermined frequency range as the working example in which the basis weight and the outer diameter and the height of the air bubble portion are increased respectively and which is included among the above-mentioned first to third working examples.

On the other hand, comparing the graphs 4 and 5 of FIGS. 7 and 8 corresponding to the above-mentioned first and second comparative examples with each other, the sound absorbing coefficient is maintained to be low in the first comparative example, even if the frequency becomes high within the above-mentioned predetermined frequency range, as shown in the graph 4 of FIG. 7. Also, in the second comparative example, the sound absorbing coefficient is higher than that in the first comparative example, as understood from the graphs 4 and 5 of FIGS. 7 and 8.

Subsequently, comparing each of the first to third working examples with the first and second comparative examples, it can be understood that in the first working example (See the graph 1 of FIG. 6), the sound absorbing coefficient is higher than that of the first comparative example at the higher frequency side within the above-mentioned predetermined frequency range.

Also, in the second working example (See the graph 2 of FIG. 7), the sound absorbing coefficient is higher than that in the first comparative example (See the graph 4 of FIG. 7) and shows an increasing tendency substantially similar to that in the second comparative example in accordance with an increase of the frequency.

Further, in the third working example (See the graph 3 of FIG. 8), it is understood that the sound absorbing coefficient is higher than that in the first comparative example (See the graph 4 of FIG. 7) in all the frequencies, and also rises while keeping higher than that in the second comparative example (see the graph 5 of FIG. 8) up to approximately the frequency of 4000 (Hz) in accordance with the increase of the frequency.

According to the above-described description, it can be understood that each of the above-described first to third working examples shows more favorable sound absorbing coefficient than that of the first comparative example. Also, it can be understood that each of the second and third working examples shows more favorable sound absorbing coefficient than that of the second comparative example. Thus, each of the second and third working examples is considered to be favorable as its entirety as the sound absorption sheet.

Further, in the above-described second working example, a large number of sound absorption sheets in which the outer diameter of the air bubble portion of the film 53 and the thickness of each of the films 52 and 53 are changed in various ways are prepared. Examining a relationship between the sound absorbing coefficient and the frequency regarding each of a large number of the sound absorption sheets, as described above, it is understood that the sound absorbing coefficient as the sound absorption sheet of the engine under cover can be favorably ensured, if the outer diameter and the height of each air bubble portion are maintained respectively to be values within a range of 5 (mm) to 100 (mm) and the thickness of each of the films 52 and 53 is maintained to be a value within a range of 7 (μm) to 150 (μm).

However, if the outer diameter of the air bubble portion deviates from a value within the range of 5 (mm) to 100 (mm), the air bubble portion becomes too big or too small, thereby to cause lack of sound absorbing performance.

Also, if the thickness of each of the films 52 and 53 is thinner than 7 (μm), each of the films 52 and 53 becomes easy to be torn. On the other hand, if the thickness of each of the films 52 and 53 increases beyond 150 (μm), each of the films 52 and 53 becomes hard and lack of flexibility under the increase of its basis weight. This causes lack of sound absorbing performance of each of the films 52 and 53 and ease of handling of the same. In addition, it is, needless to say, light-weighted as the sound absorption sheet that the thickness of each of the films 52 and 53 is maintained to be a value within the range of 7 (μm) to 150 (μm).

Further, in the first embodiment, the height of the air bubble portion may be maintained to be a value within a range of 5 (mm) to 50 (mm), in case a space under the bottom part of the engine E, particularly a space formed under the oil pan 20 between the oil pan 20 and the cover main body 50a is narrow. According to this description, in case the outer diameter of the air bubble portion is maintained to be a value within the range of 5 (mm) to 100 (mm), it is easy to apply the engine under cover below the oil pan 20 with substantially ensuring favorably the sound absorbing performance of the sound absorption sheet, even if the height of the air bubble portion is maintained to be a value within the range of 5 (mm) to 50 (mm).

Figure 9:
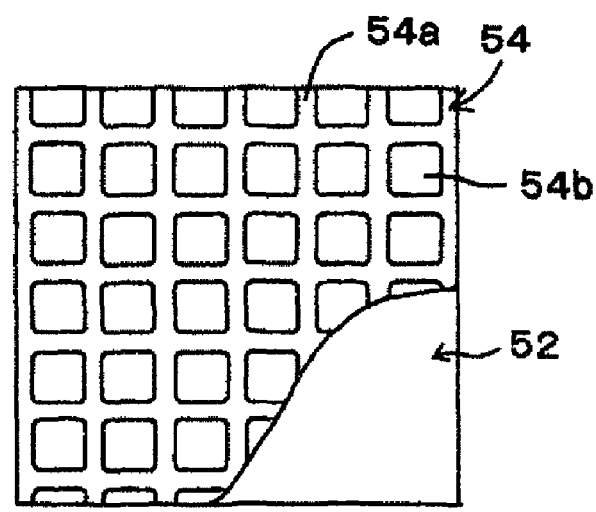
FIG. 9 is a partially cut-away plan view illustrating a sound absorption sheet which is a feature of a second embodiment of the present invention.

FIG. 9 illustrates an essential part of a second embodiment of the present invention. In the second embodiment, adopted is a construction in which in the sound absorption sheet 50b described in the first embodiment, the film 53 is replaced with a film 54.

The film 54 is formed by a fire-retardant polyethylene resin like the film 53 and is provided with a flat membrane or film portion 54a and a large number of air bubble portions 54b. This film 54 is adhered at the rear face of the flat film portion 54a to the front face of the film 52.

Figure 10:
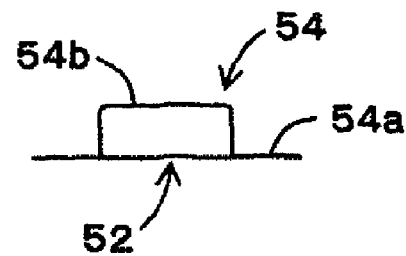
FIG. 10 is an enlarged sectional view of an air bubble portion of the sound absorption sheet shown in FIG. 9.

A large number of the air bubble portions 54b of the film 54 are, as shown in FIG. 9, dispersed from each other in the shape of lattice and formed along the planar direction of the film 52. Also, a large number of the air bubble portions 54b are, as exemplified in FIG. 10, protuberated or raised and formed respectively in the shape of a square tube from each portion of the film 52 corresponding to each air bubble portion 54b toward the thickness direction of the flat film portion 54a. And, air is sealed or enclosed in the interior of each of a large number of the air bubble portions 54b.

In the second embodiment, the film 54 has the same basis weight (for example, 80 (g/m$^2$) and thickness (for example, (mm)) as those of the film 53. Each of the air bubble portions 54b has a predetermined width (for example, 20 (mm)) and a predetermined height (for example, 7 (mm)).

Herein, the above-described predetermined width corresponds to a width (corresponding to the outer diameter described in the first embodiment) between outer faces of both opposing wall portions of the square tube shaped peripheral wall portion of the air bubble portion 54b.

The above-described predetermined height corresponds to an interval between the upper face of the film 52 and the surface of the top wall portion of the air bubble portion 54b. The number of the air bubble portion 54b is predetermined into a value as many as possible so that the sound absorption sheet of the second embodiment can favorably exert its sound absorbing performance. In addition, the sound absorption sheet 50b of the second embodiment is also manufactured so as to have the above-described construction by the same manufacturing method as that of the first embodiment. The other constructions are the same as those of the first embodiment.

According to the second embodiment constructed as described above, though each of the air bubble portions 54b is arranged in the form of lattice, differing from the staggered arrangement of the air bubble portions 53b described in the first embodiment, the sound absorption sheet of the second embodiment can exert favorable sound absorbing performance under the air bubble portions 54b, like the sound absorbing performance of the sound absorption sheet 50b of the first embodiment under the air bubble portions 53b of the sound absorption sheet 50b. As a result, in the second embodiment, the same operation and effect as those of the first embodiment can be attained.

In addition, changing the width and the height of each of the air bubble portions 54b and the thickness of each film of the sound absorption sheet of the second embodiment in various ways, it has been found that the sound absorbing performance as the sound absorption sheet of the engine under cover can be favorably ensured like the first embodiment, if the width and the height of the air bubble portion are maintained to be respective values within a range of 5 (mm) to 100 (mm) and the thickness of each film is maintained to be a value within a range of 7 (μm) to 150 (μm).

Figure 11:
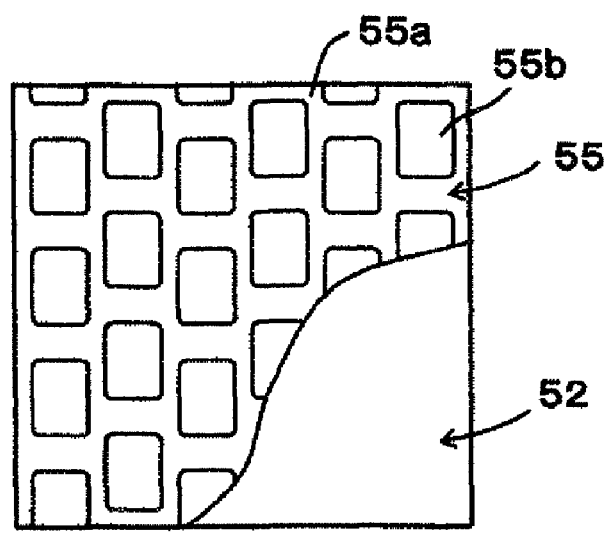
FIG. 11 is a partially cut-away plan view illustrating a sound absorption sheet which is a feature of a third embodiment of the present invention.

FIG. 11 illustrates an essential part of a third embodiment of the present invention. In the third embodiment, adopted is a construction in which in the sound absorption sheet described in the second embodiment, the film 54 is replaced with a film 55.

The film 55 is formed by a fire-retardant polyethylene resin like the film 54 and is provided with a flat membrane or film portion 55a and a large number of air bubble portions 55b. This film 55 is adhered at the rear face of the flat film portion 55a to the front face of the film 52.

A large number of the air bubble portions 55b of the film 55 are, as shown in FIG. 11, dispersed from each other in the form of a staggered arrangement and formed along the planar direction of the film 52, differing from a large number of the lattice-shaped air bubble portions 54b described in the second embodiment. Also, a large number of the air bubble portions 55b are protuberated or raised and formed respectively in the shape of a rectangular tube from each portion of the film 52 corresponding to each air bubble portion 55b toward the thickness direction of the flat film portion 55a. And, air is sealed or enclosed in the interior of each of a large number of the air bubble portions 55b.

Additionally, in the third embodiment, the film 55 has the same basis weight (for example, 80 (g/m²)) and thickness (for example, 20 (mm)) as those of the film 54. The other constructions are the same as those of the second embodiment.

In the third embodiment constructed as described above, each of the air bubble portions 55b is arranged in the staggered shape as described above and is only formed in the shape of a rectangular tube, differing from each of the air bubble portions 54b. Therefore, according to the third embodiment, the same operation and effect as those of the second embodiment can be attained.

Figure 12:
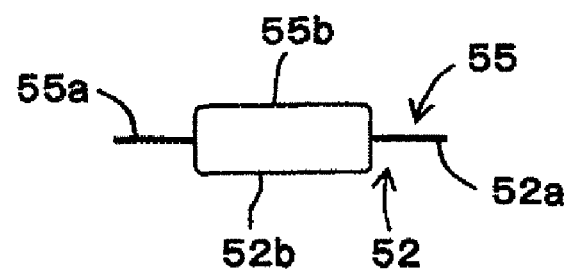
FIG. 12 is an enlarged sectional view illustrating an air bubble portion of a sound absorption sheet which is a feature of a fourth embodiment of the present invention.

FIG. 12 illustrates an essential part of a fourth embodiment of the present invention. In the fourth embodiment, the film 52 which is described in the above-mentioned third embodiment has a flat membrane or film portion 52a and a large number of air bubble portions 52b, differing from the third embodiment. Accordingly, in the fourth embodiment, the film 55 which is described in the third embodiment is adhered at the rear face of the flat film portion 55a to the front face of the flat film portion 52a of the film 52.

Herein, in the fourth embodiment, a large number of the air bubble portions 52b are opposed respectively to each of a large number of the air bubble portions 55b of the film 55 and are protuberated or raised and formed respectively toward the opposite direction against a large number of the air bubble portions 55b of the film 55. In addition, each of the air bubble portions 52b has a symmetrical sectional shape with respect to each of the air bubble portions 55b.

Accordingly, each of a large number of the air bubble portions 52b constructs respectively a common air bubble portion together with each of the corresponding air bubble portions 55b. And, in each of the common air bubble portions, air is sealed by twice of the quantity of air which is sealed in each of the air bubble portions 55b. The other constructions are the same as those of the third embodiment.

In the fourth embodiment constructed as described above, the film 52 has the symmetrical sectional shape with respect to the film 55. Therefore, the both films 52 and 55 form a large number of the common air bubble portions each of which seals therein by twice of the quantity of air sealed in each air bubble portion 55b as described above, differing from the above-mentioned third embodiment.

Accordingly, the sound absorption sheet of the fourth embodiment can exert further more favorable sound absorbing performance under each of the common air bubble portions than the sound absorbing performance of the sound absorption sheet of the third embodiment under each of the air bubble portions 55b. As a result, according to the fourth embodiment, the operation and effect described in the third embodiment can be further improved.

Figure 13:
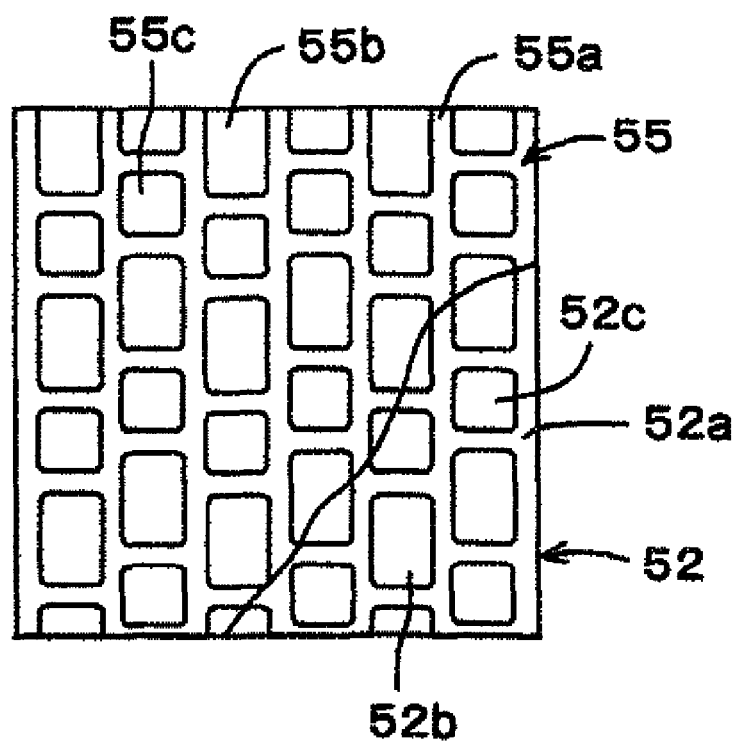
FIG. 13 is a partially cut-away plan view illustrating a sound absorption sheet which is a feature of a fifth embodiment of the present invention.

FIG. 13 illustrates an essential part of a fifth embodiment of the present invention. In the fifth embodiment, the film 52 described in the fourth embodiment forms air bubble portions 52c thereto in replacement with approximately the half of the air bubble portions 52b of a large number of the air bubble portions 52b. And, each of the air bubble portions 52c is formed in alternate arrangement with each of the air bubble portions 52b in the vertical direction of FIG. 13.

Similarly, the film 55 forms air bubble portions 55c thereto in replacement with approximately the half of the air bubble portions 55b of a large number of the air bubble portions 55b. And, each of the air bubble portions 55c is formed according to each of the air bubble portions 52c and constructs each air bubble portion which is common with each of the corresponding air bubble portions 52c.

In addition, the width of each air bubble portion 52c along the vertical direction of FIG. 13 is more narrow than the width of each air bubble portion 52b along the same direction. Similarly, the width of each air bubble portion 55c along the vertical direction of FIG. 13 is more narrow than the width of each air bubble portion 55b along the same direction. The other constructions are the same as those of the fourth embodiment.

In the fifth embodiment constructed as described above, the air bubble portions of each of the both films 52 and 55 are only formed into two kinds of shapes as described above, differing from the fourth embodiment. As a result, in the fifth embodiment, substantially the same operation and effect as that of the fourth embodiment can be also attained.

Figure 14:
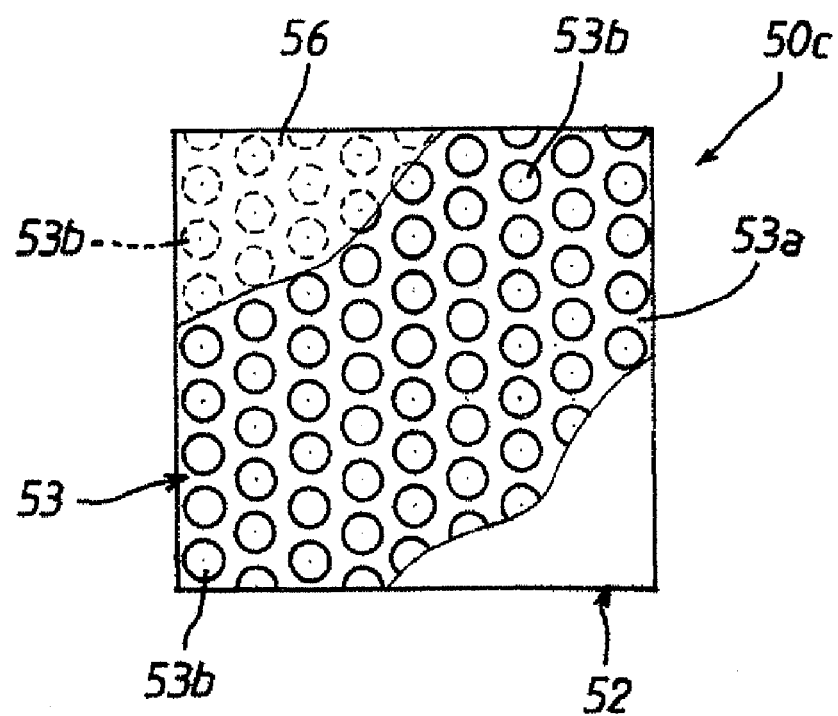
FIG. 14 is a partially cut-away plan view illustrating a sound absorption sheet which is a feature of a sixth embodiment of the present invention.
Figure 15:
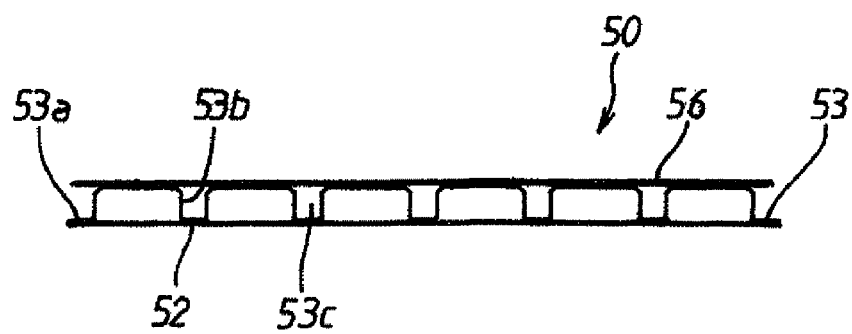
FIG. 15 is a sectional view of the sound absorption sheet shown in FIG. 14.

FIGS. 14 and 15 illustrate an essential part of a sixth embodiment of the present invention. In the sixth embodiment, a sound absorption sheet 50c is formed by adding a front skin layer 56 to the layered construction which is made of the both films 52 and 53 described in the first embodiment.

The both films 52 and 53 of the sound absorption sheet 50c are also layered in the sixth embodiment with the same construction as that of the first embodiment. And, in this sixth embodiment, the both films 52 and 53 have respectively a predetermined thickness (for example, 20 (m)) and a predetermined basis weight (for example, 100 (g/m²)) as the same as the third working example described in the first embodiment. The outer diameter and the height of each air bubble portion of the film 53 are also respectively 30 (mm) and 13 (mm) in the sixth embodiment as the same as the third working example described in the first embodiment.

The front skin layer 56 is made of an nonwoven fabric having a predetermined basis weight (for example, 70 (g/m²)) and is layered so as to oppose the film 52 through the film 53.

Herein, the front skin layer 56 is adhered at its rear face to the front face of each cylindrical top wall portion of a large number of the air bubble portions 53b of the film 53 by way of an adhesive. Accordingly, between the front skin layer 56 and the film 53, an air layer 53c is formed between each of the both adjacent air bubble portions 53b of a large number of the air bubble portions 53b.

The sound absorption sheet 50c constructed as described above is attached at the rear face of the film 52 along the front face of the cover main body 50a so that the front skin layer 56 follows the rear face of the oil pan 20 at its front face through an interval. The other constructions are the same as those of the first embodiment.

In the sixth embodiment constructed as described above, engine sounds which are propagated toward the engine under cover 50 through the oil pan 20 among the engine sounds generated by the engine E like the first embodiment enter the sound absorption sheet 50c.

Herein, in the sixth embodiment, the front skin layer 56 opposes at its front face to the rear face of the oil pan 20. Thus, the engine sounds propagated as described above enter the front skin layer 56 of the sound absorption sheet 50c from the front face side thereof.

Then, the engine sounds entering the front skin layer 56 as described above are absorbed and reduced by the front skin layer 56 under the sound absorbing performance of the nonwoven fabric which is forming material of the front skin layer 56. Thereafter, the engine sounds reduced by the front skin layer 56 as described above further enter the film 53 of the sound absorption sheet 50c from the front face side thereof.

Herein, the engine sounds which are reduced and enter the film 53 as described above are reflected by the both films 53 and 52, like the case of the sound absorption sheet 50b described in the first embodiment. However, the reflection to the engine sounds done by the both films 53 and 52 is favorably restrained by the both films 53 and 52 under each air bubble portion 53b. As a result, the engine sounds entering the both films 53 and 52 can be favorably reduced.

This means that the favorable sound absorbing performances of the front skin layer 56 and the films 53 and 52 act synergistically as the sound absorbing performance of the sound absorption sheet 50c to the engine sounds generated from the engine E.

As a result, by means of the sound absorption sheet 50c, the engine sounds generated from the engine E can be sound-proofed by further favorable sound absorption as compared with the case of the both films 53 and 52 corresponding to the sound absorption sheet 50b described in the first embodiment.

Also, the front skin layer 56 made of an nonwoven fabric is layered onto the both films 52 and 53 from the side of the film 53. Thus, the front skin layer 56 can favorably protect the both films 52 and 53 without incurring damages of the both films 52 and 53. The other operation and effect are the same as those of the first embodiment.

Incidentally, the sound absorption sheet 50c of the sixth embodiment is referred to as a working example (hereinafter called as a fourth working example). In addition to the fourth working example, a layer-construction formed by the both films 52 and 53 of the sound absorption sheet 50c is prepared as a comparative example (hereinafter called as a third comparative example).

By using each of these working example and comparative example as each sample, a reverberation chamber sound absorbing coefficient test was adopted to each sample so as to examine a relationship between a sound absorbing coefficient and a frequency.

Figure 16:
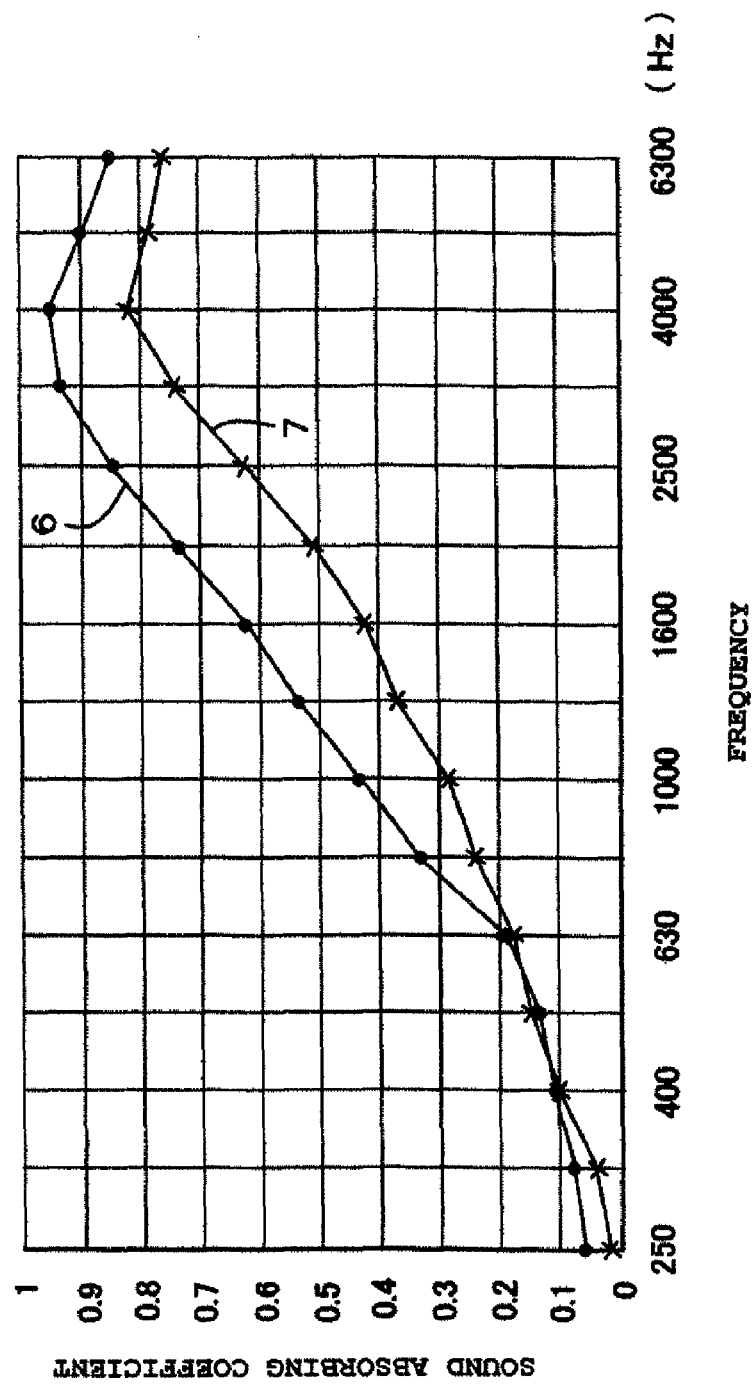
FIG. 16 is each graph illustrating respectively a relationship between the sound absorbing coefficient and the frequency of each of a fourth working example and a third comparative example of the sixth embodiment.

Examining a relationship between the sound absorbing coefficient and the frequency regarding the fourth working example by the above-mentioned reverberation chamber sound absorbing coefficient test, a graph 6 shown in FIG. 16 was obtained.

Also, examining a relationship between the sound absorbing coefficient and the frequency regarding the third comparative example by the above-mentioned reverberation chamber sound absorbing coefficient test, a graph 7 shown in FIG. 16 was obtained. In addition, the frequency range is the predetermined frequency range (for example, 200 (Hz) to 6000 (Hz)), like the first embodiment.

By comparing the graph 6 corresponding to the fourth working example as described above with the graph 7 corresponding to the third comparative example, it is understood that the sound absorbing coefficient of the fourth example is raised over the substantially entirety of the predetermined frequency range as compared with the sound absorbing coefficient of the third comparative example.

Therefore, it can be considered that as the sound absorption sheet, the sound absorption sheet 50c having an nonwoven fabric as the front skin layer 56 exerts further more favorable sound absorbing performance as compared with the layer-construction of the both films 52 and 53 corresponding to the sound absorption sheet 50b which is described in the first embodiment.

Additionally, in the fourth working example, a large number of the sound absorption sheets in which the basis weight of the front skin layer 56, the outer diameter of the air bubble portion of the film 53 and the thickness of each of the films 52 and 53 are changed in various ways are prepared.

Examining a relationship between the sound absorbing coefficient and the frequency regarding each of a large number of the sound absorption sheets, as described above, it has been found that sound absorbing performance as the sound absorption sheet of the engine under cover in the sixth embodiment can be favorably ensured, as long as the outer diameter and the height of the air bubble portion are maintained respectively to be values within a range of 5 (mm) to 100 (mm), the thickness of each of the films 52 and 53 is maintained to be a value within a range of 7 (μm) to 150 (μm), and the basis weight of the front skin layer 56 is maintained to be a value within a range of 10 (g/m$^2$) to 200 (g/m$^2$).

Herein, if the basis weight of the front skin layer 56 is less than 10 (g/m$^2$), the front skin layer 56 is easy to be torn because it is made of an nonwoven fabric. If the basis weight of the front skin layer 56 increases beyond 200 (g/m$^2$), the front skin layer 56 is too thick and lacks flexibility. Thus, the handling as the sound absorption sheet 50c becomes inconvenient, and sound absorbing performance of the sound absorption sheet 50c is lowered.

Figure 17:
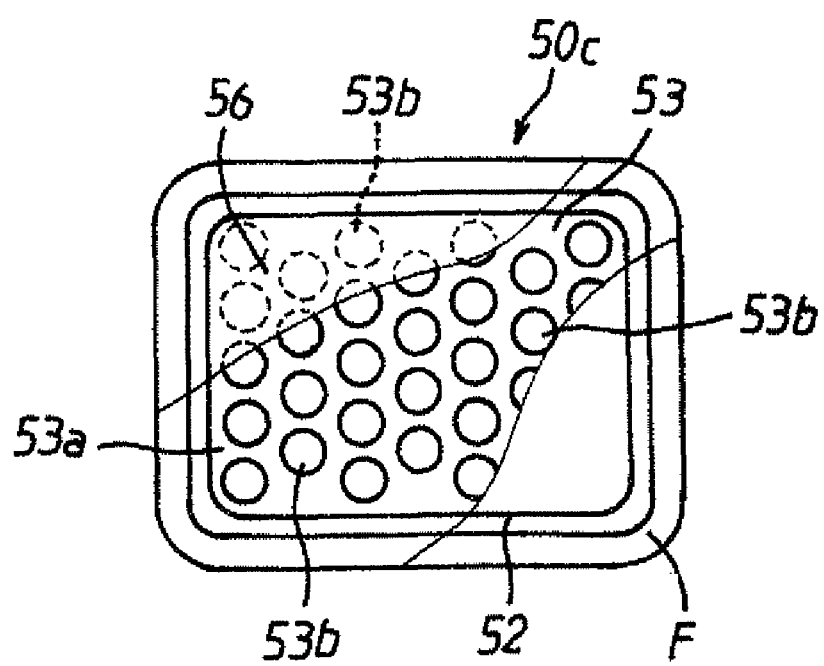
FIG. 17 is a partially cut-away plan view of a sound absorption sheet which is a feature of a seventh embodiment of the present invention.
Figure 18:
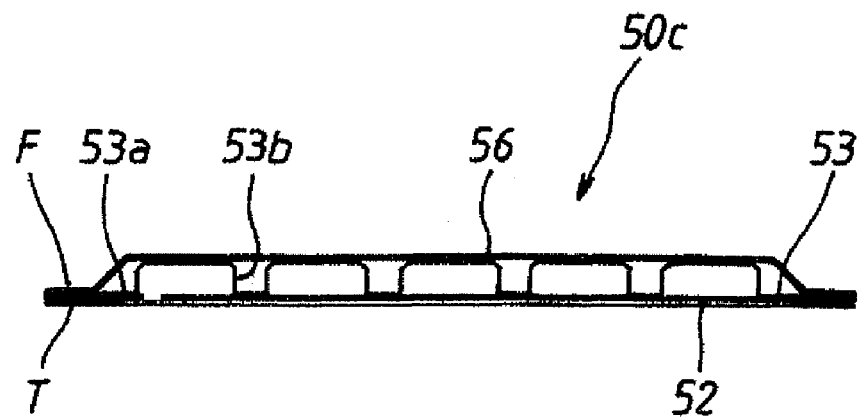
FIG. 18 is a sectional view of the sound absorption sheet shown, in FIG. 17.

FIGS. 17 and 18 illustrate an essential part of a seventh embodiment of the present invention. In the seventh embodiment, the sound absorption sheet 50c described in the sixth embodiment is heated at its outer peripheral edge portion by high-frequency induction heating or the like and is compressedly fusioned (or fused and bonded) as an annular flange portion F.

Herein, the annular flange portion F is formed thin by heating and compressedly fusioning the outer periphery portion of the front skin layer 56 to the outer periphery portion of the film 52 through the outer periphery portion of the film 53 on the basis of the outer periphery portion of the film 52.

In the sound absorption sheet 50c formed as described above, the film 52 is contacted at its rear face with the front face of the cover main body 50a, and the annular flange portion F is adhered to the front face of the cover main body 50a by an annular double-sided tape T (See FIG. 18). Thus, the sound absorption sheet 50c is attached to the cover main body 50a. The other constructions are the same as those of the sixth embodiment.

According to the seventh embodiment constructed as described above, for attaching the sound absorption sheet 50c to the front face of the cover main body 50a, the annular flange portion F of the sound absorption sheet 50c is adhered by the double-sided tape T to the front face of the cover main body 50a from the side of the film 52 as described above.

Herein, the annular flange portion F is formed by compressedly fusioning the outer periphery portion of the front skin layer 56 to the outer periphery portion of the film 52 by heating through the outer periphery portion of the film 53, as described above. Thus, the annular flange portion F is formed thin in a condition in which the front skin layer 56, the film 53 and the film 52 are united at their outer periphery portions.

Therefore, attachment of the sound absorption sheet 50c to the cover main body 50a can be achieved firmly by only adhering of the double-sided tape T. As a result, not only the firm attachment of the sound absorption sheet 50c to the cover main body 50a can be completed with a simple work in a simple construction but also sound absorption of noises by the sound absorption sheet can be achieved further reliably under the firm attachment of the sound absorption sheet to the above-mentioned constituent members. The other operation and effect are the same as those of the sixth embodiment.

Figure 19:
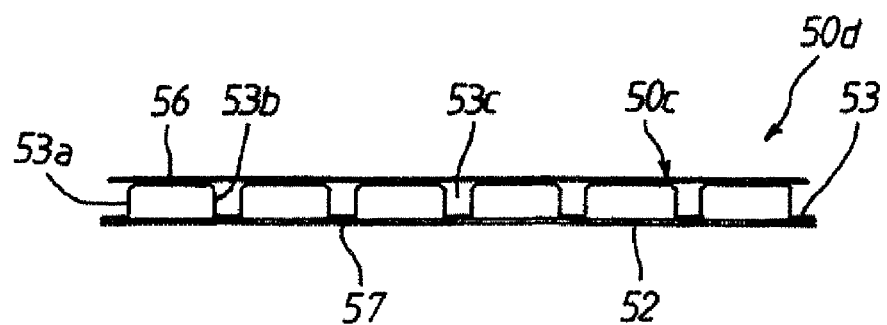
FIG. 19 is a sectional view of a sound absorption sheet which is a feature of an eighth embodiment of the present invention.

FIG. 19 illustrates an essential part of the eighth embodiment of the present invention. In the eighth embodiment, a sound absorption sheet 50d is constructed by adding a rear skin layer 57 to the sound absorption sheet 50c described in the sixth embodiment.

The rear skin layer 57 is layered along the film 52 so as to oppose the film 53 of the sound absorption sheet 50c through the film 52 of the sound absorption sheet 50c. In the eighth embodiment, the rear skin layer 57 is formed by aluminum with a predetermined thickness (for example, 30 (μm)) and a predetermined basis weight (for example, 70 (g/m$^2$).

In the eighth embodiment, the total basis weight of the sound absorption sheet 50d is 240 (g/m$^2$), because the rear skin layer 57 has the basis weight of 70 (g/m$^2$) and the sound absorption sheet 50c has the basis weight of 170 (g/m$^2$).

Also, the rear skin layer 57 is contacted to the both films 52 and 53 from the side of the film 52 before layering the front front skin layer 56 to the film 53 and thereafter is fusioned together with the both films 52 and 53. Therefore, the front skin layer 56 is layered onto the film 53 after fusioning as described above.

The sound absorption sheet 50d constructed as described above is uniformly attached at the rear face of the rear skin layer 57 along the front face of the cover main body 50a so that the front skin layer 56 follows at its rear face along the rear face of the oil pan 20 through the interval. The other constructions are the same as those of the sixth embodiment.

In the eighth embodiment constructed as described above, when the engine sounds reduced by the front skin layer 56 like the sixth embodiment enter the film 53 of the sound absorption sheet 50d from the front face side thereof, the engine sounds are reflected by the both films 53 and 52 as described in the sixth embodiment. However, the reflection to the engine sounds done by the both films 53 and 52 is favorably restrained by the both films 53 and 52 under each air bubble portion thereof. As a result, the engine sounds are favorably absorbed by the both films 52 and 53 under each air bubble portion thereof and thereafter enters the rear skin layer 57.

Herein, since the rear skin layer 57 is formed by aluminum, the engine sounds entering the rear skin layer 57 are reflected by the rear skin layer 57 toward the film 52. Thus, the engine sounds reflected as described above are favorably absorbed by the both films 52 and 53 again under each air bubble portion thereof and thereafter absorbed favorably by the front skin layer 56.

This means that after the front skin layer 56 and the both films 53 and 52 reduce the engine sounds from the engine E under the synergistic sound absorbing performances of thereof, they reduce favorably again the engine sounds reflected by the rear skin layer 57 under the synergistic sound absorbing performances.

As a result, by means of the sound absorption sheet 50d, the engine sounds generated from the engine E can be absorbed further more favorably as compared with the case by the sound absorption sheet 50c described in the sixth embodiment.

Also, since the rear skin layer 57 is formed by aluminum as described above, the original state of the both films 52 and 53 can be appropriately maintained by the rear skin layer 57. In other words, even if the sound absorption sheet 50d is heated, the both films 52 and 53 are maintained in the original states thereof appropriately by the rear skin layer 57 without causing deformation such as expansion or contraction by heat. The other operation and effect are the same as those of the sixth embodiment.

Incidentally, the sound absorption sheet 50c of the sixth embodiment is referred to as a working example (hereinafter called as a fifth working example). In addition to the fifth working example, prepared is the third comparative example (the layer-construction formed by the both films 52 and 53 of the sound absorption sheet 50c) described in the sixth embodiment. And, as a comparative example (hereinafter called as a fourth comparative example), prepared is a layer-construction which is formed by the both films 52 and 53 of the sound absorption sheet 50d and the rear akin layer 57.

By using each of the fifth working example and the third and fourth comparative examples as each sample, the reverberation chamber sound absorbing coefficient test was adopted to each sample so as to examine a relationship between a sound absorbing coefficient and a frequency.

Figure 20:
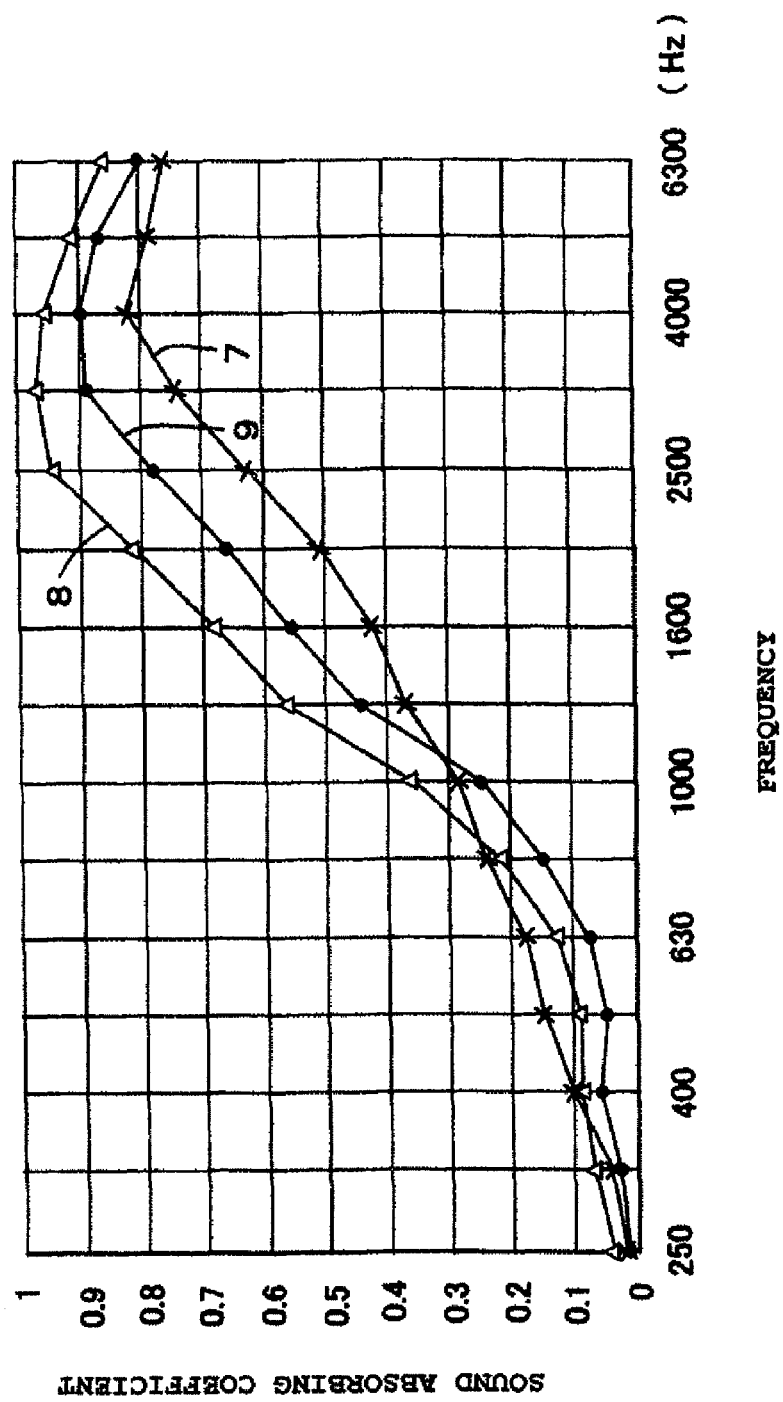
FIG. 20 is each graph illustrating respectively a relationship between the sound absorbing coefficient and the frequency in each of a fifth working example and a fourth comparative example of the eighth embodiment together with the graph of the third comparative example shown in FIG. 16.

Examining a relationship between the sound absorbing coefficient and the frequency regarding the fifth working example by the above-mentioned reverberation chamber sound absorbing coefficient test, a graph 8 shown in FIG. 20 was obtained.

Also, Examining a relationship between the sound absorbing coefficient and the frequency regarding the fourth comparative example by the above-mentioned reverberation chamber sound absorbing coefficient test, a graph 9 shown in FIG. 20 was obtained. In addition, about the third comparative example, the graph 7 of FIG. 16 described in the sixth embodiment is shown as the graph indicating the relationship between the sound absorbing coefficient and the frequency in FIG. 17. The frequency range is the predetermined frequency range (for example, 200(Hz) to 6000 (Hz)), like the first embodiment.

Comparing the graph 8 corresponding to the fifth working example as described above with the graph 9 corresponding to the fourth comparative example, it is understood that the sound absorbing coefficient of the fifth working example is raised over the substantially entirety of the predetermined frequency range as compared with the sound absorbing coefficient of the fourth comparative example.

Also, comparing the graphs 7 and 9 respectively corresponding to the third and fourth comparative examples, with each other, it is understood that the sound absorbing coefficient of the fourth comparative example is raised in the frequency range not less than 1000 (Hz) in the above-described predetermined frequency range, as compared with the sound absorbing coefficient of the third comparative example.

Further, comparing the graph 8 corresponding to the fifth working example with the graph 7 corresponding to the third comparative example, it is understood that the sound absorbing coefficient of the fifth working example is raised in the frequency range not less than approximately 1000 (Hz) in the above-described predetermined frequency range, as compared with the sound absorbing coefficient of the third comparative example.

Therefore, it is recognized as the sound absorption sheet that the sound absorption sheet 50d which has the layer made of aluminum as the rear skin layer 57 has further more favorable sound absorbing performance than the layer-construction formed by the both films 52 and 53 or the layer-construction formed by the both films 52 and 53 and the rear skin layer 57.

Additionally, comparing the graph 8 corresponding to the fifth working example with the graph 6 corresponding to the fourth working example (sound absorption sheet 50c) described in the sixth embodiment, it is understood that the sound absorbing coefficient of the fifth working example is substantially the same as the sound absorbing coefficient of the fourth working example over the entirety of the above-described predetermined frequency range.

Also, in the fifth working example, a large number of sound absorption sheets in which the thickness of the rear skin layer 57, the basis weight of the front skin layer 56, the outer diameter of the air bubble portion of the film 53 and the thickness of each of the films 52 and 53 are changed in various ways are prepared.

Examining a relationship between the sound absorbing coefficient and the frequency regarding each of a large number of the sound absorption sheets, as described above, it has been found that sound absorbing performance as the sound absorption sheet of the engine under cover in the seventh embodiment can be favorably ensured, as long as the outer diameter and the height of the air bubble portion are maintained respectively to be values within a range of 5 (mm) to 100 (mm), the thickness of each of the films 52 and 53 is maintained to be a value within a range of 7 ($\mu$m) to 150 ($\mu$m), the basis weight of the front skin layer 56 is maintained to be a value within a range of 10 (g/m$^2$) to 200 (g/m$^2$), and the thickness of the rear skin layer 57 is maintained to be a value within a range of 10 ($\mu$m) to 100 ($\mu$m).

Herein, if the thickness of the rear skin layer 57 is less than 10 ($\mu$m), the rear skin layer 57 is easy to be torn because since it is made of aluminum. If the thickness of the rear skin layer 57 becomes thicker than 100 ($\mu$m), the rear skin layer 57 is too thick and lacks flexibility, and the handling thereof as the sound absorption sheet 50d becomes inconvenient.

Figure 21:
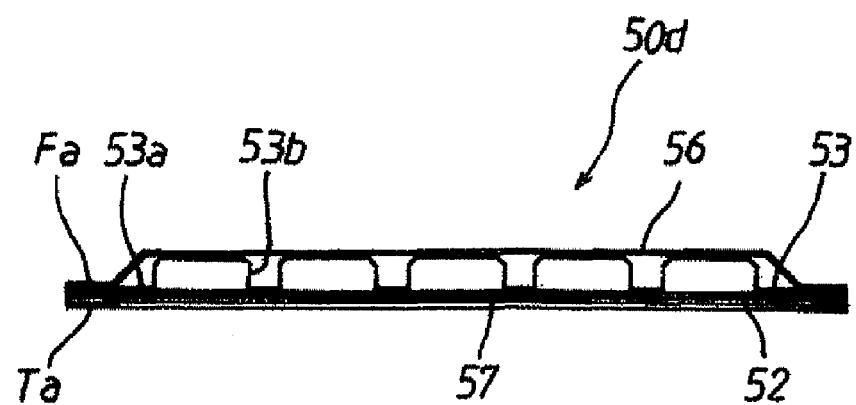
FIG. 21 is a sectional view of a sound absorption sheet which is a feature of a ninth embodiment of the present invention.

FIG. 21 illustrates an essential part of a ninth embodiment of the present invention. In the ninth embodiment, an outer peripheral edge portion of the sound absorption sheet 50d described in the eighth embodiment is heated and compressedly fusioned (or fused and bonded) by high-frequency induction heating or the like as an annular flange portion Fa.

Herein, the annular flange portion Fa is formed thin by heating and compressedly fusioning the outer periphery portion of the front skin layer 56 to the outer periphery portion of the rear skin layer 56 through the outer periphery portion of the both films 53 and 52 on the basis of the outer periphery portion of the rear skin layer 57.

In the sound absorption sheet 50d formed as described above, the rear skin layer 57 is contacted at its rear face with the front face of the cover main body 50a, and the annular flange portion Fa is adhered to the front face of the cover main body 50a by the annular double-sided tape Ta (See FIG. 21). Thus, the sound absorption sheet 50d is attached to the cover main body 50a. The other constructions are the same as those of the eighth embodiment.

According to the ninth embodiment constructed as described above, for attaching the sound absorption sheet 50d to the front face of the cover main body 50a, the annular flange portion Fa of the sound absorption sheet 50d is adhered by a double-sided tape Ta to the front face of the cover main body 50a from the side of the rear skin layer 57 as described above.

Herein, the annular flange portion Fa is formed by compressedly fusioning the outer periphery portion of the front skin layer 56 to the outer periphery portion of the rear skin layer 57 by heating through each of the outer periphery portions of the both films 53 and 52, as described above. Thus, the annular flange portion Fa is formed thin in a condition in which the front skin layer 56, the film 53, the film 52 and the rear skin layer 57 are united at their outer periphery portions.

Therefore, attachment of the sound absorption sheet 50d to the cover main body 50a can be achieved firmly by only adhering of the double-sided tape Ta. This means that the attachment of the sound absorption sheet 50d onto the cover main body 50a can be completed with a simple work in a simple construction. The other operation and effect are the same as those of the eighth embodiment.

In addition, the following various modifications may be given for embodying the present invention without being limited to the above-mentioned embodiments.

(1) The forming material of each of the films 52 to 55 may be a thermoplastic resin such as a polypropylene resin, a nylon resin, a polyester resin or a fluorine resin or the like and other fire-retardant polymer organic materials without being limited to the fire-retardant polyethylene resin described in each of the above-described embodiments.

In case the sound absorption sheet 50b, 50c or 50d is used in an atmosphere at such a temperature that is difficult to be damaged by heat, the above-described thermoplastic resins and other polymer organic materials do not necessarily have to have the fire retardancy.

(2) Although the air bubble portions are formed in the staggered arrangement in the first embodiment, they may be formed in the lattice arrangement state without being limited to the staggered arrangement. In general, as long as a large number of the air bubble portions are dispersed and located, they may be formed in any arrangement.

(3) In the above-described fourth embodiment (See FIG. 12), each of the air bubble portions 52b of the film 52 is formed so as to oppose each of the air bubble portions 55b of the film 55. However, without this limitation, each of the air bubble portions 52b may be raised or protuberated and formed toward a direction opposite to that of each of the air bubble portions 55b at a position which is different from that of each of the air bubble portions 55b in the direction along the face of each of the flat film portions of the both films 52 and 55.

This is also applied to the above-described fifth embodiment (See FIG. 13). Each of the air bubble portions 52b and 52c may be raised or protuberated and formed toward a direction opposite to that of each of the air bubble portions 55b and 55c at a position which is different from that of each of the air bubble portions 55b and 55c in the direction along the face of each of the flat film portions of the both films 52 and 55.

(4) The film 52 described in the first or second embodiment (See FIG. 5 or 10) may be formed not only by the fire-retardant polyethylene resin but also by a polymer organic material such as a fire-retardant foaming propylene sheet, a fire-retardant polyethylene sheet or the like. Additionally, in the eighth embodiment, the film 52 does not need to have flexible elasticity, since the rear skin layer 57 is layered to the film 52.

(5) For embodying the present invention, the films 52 to 55 may be respectively a membrane or a layer. In addition, the membrane is assumed to be somewhat thicker than the film, while the layer is assumed to be somewhat thicker than the membrane.

(6) For embodying the present invention, the sound absorption sheet 50b, 50c or 50d may be applied not only to the engine under cover 50 but also to for example a bonnet hood of the motor vehicle.

(7) For embodying the present invention, the sound absorption sheet 50b, 50c or 50d may be contained not only in the engine under cover 50 but also in a pillar of a body of a motor vehicle in a rolled state. As a result, the engine sound propagated in the pillar can be absorbed.

(8) For embodying the present invention, the rear skin layer 57 is not fusioned to both films by heating, as described in the sixth embodiment but adhered to the both films 52 and 53 from the side of the film 52 by an adhesive.

(9) For embodying the present invention, the sound absorbing performance of the sound absorption sheet can be favorably ensured under each of the air bubble portions, if the number and the shape of each air bubble portion are set so that noises of frequencies within the above-described predetermined frequency range are absorbed.

(10) For embodying the present invention, the thickness of the above-described film 52, 53, 54 or 55 is set within the range of 7 (μm) to 150 (μm), as described above. That is the reason why the sound absorbing characteristics of the film 52, 53, 54 or 55 are substantially the same, if the thickness of the film 52, 53, 54 or 55 is not limited to 7 (μm) to 100 (μm) but maintained to be a value within a range of 7 (μm) to 150 (μm).

(11) For embodying the present invention, the sound absorption sheet 50b described in the first embodiment is not limited to a single sheet but a new sound absorption sheet which may be formed by layering two or in general plural sheets. According to this construction, the sound absorbing performance (particularly, the sound absorbing performance in a low frequency range) in the case of the single sound absorption sheet 50b can be further improved.

| (Explanation of letters or numerals) | |
|---|---|
| 10 | engine under cover |
| 50 | engine under cover |
| 50a | cover main body |
| 50b, 50c, 50d | sound absorption sheet |
| 52, 53, 54, 55 | film |
| 52a, 53a, 54a, 55 | flat film portion |
| 52b, 53b, 54b, 55b | air bubble portion |
| 56 | front skin layer |
| 57 | rear skin layer |
| E | engine |
| F, Fa | annular flange portion |
| T, Ta | annular double-sided tape |

What is claimed is:

1. A sound absorption sheet for a motor vehicle, comprising:
   a first film formed by a polymer organic material; and
   a second film formed by a polymer organic material;
   wherein said second film includes a flat film portion adhered to said first film, and a plurality of air bubble portions dispersed respectively along said first film and raised from said flat film portion toward a direction separating from said first film to seal air therein so as to exert sound absorbing performance.

2. The sound absorption sheet for a motor vehicle according to claim 1, wherein said first and second films have a thickness within a range of 7 (μm) to 150 (μm), and said plurality of air bubble portions of said second film are cylindrical air bubble portions having a diameter and a height within a range of 5 (mm) to 100 (mm).

3. The sound absorption sheet for a motor vehicle according to claim 1, further comprising a skin layer formed by a porous material, said skin layer being adhered to said plurality of air bubble portions of said second film so as to oppose said first film through said second film.

4. The sound absorption sheet for a motor vehicle according to claim 3, wherein said both first and second films have a thickness within a range of 7 (μm) to 150 (μm), and said plurality of air bubble portions are cylindrical air bubble portions having a diameter and a height within a range of 5 (mm) to 100 (mm).

5. The sound absorption sheet for a motor vehicle according to claim 4, wherein said skin layer has a basis weight within a range of 10 (g/m$^2$) to 200 (g/m$^2$).

6. The sound absorption sheet for a motor vehicle according to claim 5, wherein the porous material forming said skin layer is a nonwoven fabric.

7. A sound absorption sheet for a motor vehicle, comprising:
   a first film formed by a polymer organic material;
   a second film formed by a polymer organic material;
   a first layer formed by a porous material and layered along said second film so as to oppose said first film through said second film; and
   a second layer formed by a metal material and layered along said first film so as to oppose said second film through said first film;
   wherein said second film includes a flat film portion adhered to said first film, and a plurality of air bubble portions dispersed along said first film and raised from said flat film portion toward a direction separating from said first film to seal air therein so as to exert sound absorbing performance.

8. The sound absorption sheet for a motor vehicle according to claim 7, wherein the metal material forming said second layer is aluminum.

9. An engine under cover for a motor vehicle disposed along a bottom part of an engine arranged in an engine room of the motor vehicle, comprising:
   a cover main body made of a synthetic resin plate and supported along the bottom part of the engine; and
   a sound absorption sheet including first and second films and a skin layer,
   wherein said first film is formed by a polymer organic material;
   wherein said second film is formed by a polymer organic material and includes,
      a flat film portion adhered to said first film, and
      a plurality of air bubble portions dispersed along said first film and raised from said flat film portion toward a direction separating from said first film to seal air therein so as to exert sound absorbing performance;
   wherein said skin layer is formed by a porous material and adhered to said plurality of air bubble portions of said second film so as to oppose said first film through said second film; and
   wherein said sound absorption sheet is attached at said first film to the cover main body from the bottom part side of the engine so as to locate said skin layer at the engine side of said first film.

10. The engine under cover for a motor vehicle according to claim 9, wherein the porous material forming said skin layer is a nonwoven fabric.

11. An engine under cover for a motor vehicle disposed along a bottom part of an engine arranged in an engine room of the motor vehicle, comprising:
- a cover main body made of a synthetic resin plate and supported along the bottom part of the engine; and
- a sound absorption sheet including first and second films and first and second layers;

wherein said first film is formed by a polymer organic material;

wherein said second film is formed by a polymer organic material and includes,
- a flat film portion adhered to said first film, and
- a plurality of air bubble portions dispersed respectively along said first film and raised from said flat film portion toward a direction separating from said first layer film to seal air therein so as to exert sound absorbing performance;

wherein said first layer is formed by a porous material and adhered to said plurality of air bubble portions of said second film so as to oppose said first film through said second film;

wherein said second layer is formed by a metal material and layered along said first film so as to oppose said second film through said first film; and wherein said sound absorption sheet is attached at said second layer to the cover main body from the bottom part side of the engine so as to locate said second film at the engine side of said first film.

12. The engine under cover for a motor vehicle according to claim 11, wherein the porous material forming said first layer is a nonwoven fabric.

13. The engine under cover for a motor vehicle according to claim 12, wherein the metal material forming said second layer is aluminum.

14. The engine under cover for a motor vehicle according to claim 11, wherein outer periphery portions of each of said first layer, second film, first film, and second layer are heated and fused on the basis of the outer periphery portion of said second layer to be formed as an annular flange portion.

* * * * *